United States Patent [19]

Herman et al.

[11] Patent Number: 5,076,324
[45] Date of Patent: Dec. 31, 1991

[54] QUICK DISCONNECT COUPLING

[76] Inventors: Seymour Herman, 1369 N. Ridge Rd., P.O. Box 628, Shrub Oak, N.Y. 10588; Matthew A. McCluskey, 47 Grand Ave., Newburgh, N.Y. 12550

[21] Appl. No.: 603,463
[22] Filed: Oct. 25, 1990
[51] Int. Cl.$^5$ .............................................. F16L 37/28
[52] U.S. Cl. ........................... 137/614.06; 137/614.04; 137/614.05
[58] Field of Search ................. 251/149.9; 137/614.06, 137/614.04, 614.05

[56] References Cited

U.S. PATENT DOCUMENTS

| | | | |
|---|---|---|---|
| 2,473,223 | 6/1949 | Scheiwer | 137/614.06 |
| 2,543,589 | 2/1951 | Newcomb | 137/614.06 |
| 2,696,993 | 12/1954 | Buckler | 137/614.06 |
| 3,295,584 | 1/1967 | Proctor | 251/89.5 |
| 3,424,181 | 10/1969 | Morse | 137/68 |
| 3,731,705 | 5/1973 | Butler | 137/614.06 |
| 3,840,967 | 9/1974 | Olson | 29/213 |
| 3,874,411 | 4/1975 | Vik | 137/614.06 |
| 3,916,641 | 11/1975 | Mullins | 141/348 |
| 3,935,713 | 4/1976 | Olson | 62/77 |
| 4,069,686 | 2/1978 | Hoelman | 137/322 |
| 4,181,150 | 1/1980 | Maldavs | 137/614.06 |
| 4,182,370 | 10/1980 | Karcher | 137/614.04 |
| 4,222,411 | 9/1990 | Herzan et al. | 137/614.06 |
| 4,303,098 | 12/1981 | Shindelar | 137/614.06 |
| 4,476,892 | 6/1984 | Boyce | 137/322 |
| 4,582,295 | 4/1986 | Kugler | 251/149.9 |
| 4,805,417 | 7/1989 | Weaver | 141/302 |
| 4,892,117 | 11/1990 | Spalink | 137/614.03 |

OTHER PUBLICATIONS

C & D Valve Manufacturing Co. Brochure, 1988–1989, pp. 8–9.

Primary Examiner—A. Michael Chambers
Attorney, Agent, or Firm—Lilling & Lilling

[57] ABSTRACT

A quick disconnect coupling for an access valve is disclosed which includes a housing having an independently displaced depressor mounted within the housing, a sliding sleeve mounted on one end of the housing, ball bearings retained in the housing between ball bearing cavities and the sliding sleeve, and locking means preventing the removal of the quick disconnect coupling from the access valve unless the depressor is withdrawn to seal off flow from both the valve and the quick disconnect coupling. The quick disconnect coupling can thus be attached to a valve without establishing communication therethrough or through the quick disconnect coupling until the depressor mounted within the housing is independently moved into contact with the core of the access valve.

9 Claims, 4 Drawing Sheets

QUICK DISCONNECT COUPLING

BACKGROUND OF THE INVENTION

1. Field of the Invention

The invention relates to a valve coupling, and more particularly to a quick disconnect coupling for use with air and hydraulic systems, such as refrigeration and air conditioning systems.

2. Description of the Related Art

Various couplings are used in conjunction with access valves having access cores. An access valve typically has a sealing member, or access core, which is biased into the closed position by a spring. Known couplings generally have a depressor prong of some type which contacts the access core when the coupling is affixed to the access valve, depressing the access core into a position allowing communication through the coupling and into the valve.

Such a device is shown in Olson U.S. Pat. No. 3,840,967. Olson discloses a coupling which is attached to an access valve with a nut that threadably engages the head of the access valve. A depressor can then be manually maneuvered to engage the access core of the access valve, establishing communication through the coupling and to the access valve. Such a device, however, suffers from two distinct disadvantages. The first disadvantage is that the coupling must be attached to the access valve by a threaded nut which does not allow for a rapid attachment of the coupling to the access valve. Second, the coupling can be removed from the access valve while the depressor is still in the position of pushing against the access core of the access valve which allows the potential of leakage when the coupling is disconnected.

Another type of coupling is disclosed in Morse U.S. Pat. No. 3,424,181. Morse discloses a coupling which again is attached to an access valve with a threaded nut. A manually operated depressor can then be maneuvered to contact the access core of the access valve. As mentioned regarding the Olson patent, Morse also suffers from the disadvantages of having to be threaded onto the access valve, and of the possibility of leakage should the nut be removed while the depressor is still in its depressing position.

The problem of manual connection to an access valve is addressed by various inventors. Representative of this approach is Spalink et al U.S. Pat. No. 4,892,117. Spalink discloses a refrigeration coupling which has a slidable sleeve for quick connecting and disconnecting with an access valve. The sliding sleeve is mounted on the end of the coupling and biased by a spring towards the end of the coupling. When the sleeve is pushed by the spring all the way towards the end of the coupling, ball bearings are urged through cavities in the housing of the coupling and project into the passageway on the inside of the housing of the coupling. Access valves are generally designed with a ridge about the outer periphery. The ball bearings are thus forced to lock about this ridge which causes the quick disconnect coupling to hold fast to the access valve until released by pulling back on the sliding sleeve.

Spalink, however, suffers from the disadvantage that the depressing member is spring operated. Thus, the coupling cannot be attached to an access valve without some leakage occurring. When the coupling is pressed down over the access valve in order to lock the sliding sleeve, the depressor contacts the core of the access valve and prematurely establishes communication. Conversely, in highly pressurized systems, the pressure on the depressor member of the quick disconnect coupling could be so great as to blow the coupling back away from the access valve causing possible injury to the operator of the coupling. Also, in such highly pressurized systems, the pressure from the system on the inside of the access core of the access valve may be so great as to prevent the spring operated depressing member from actually establishing communication through the access valve.

Such a coupling as that disclosed in Spalink also suffers from the disadvantage that communication through the access valve cannot be terminated prior to removing the quick disconnect coupling. Thus, as in the other art, removal of the coupling from the access valve will result in leakage of the gas in the pressurized system to the atmosphere.

It is thus an object of the invention to provide a quick disconnect coupling which can be attached to an access valve in a quick and efficient manner prior to establishing communication through the valve.

It is a further object of the invention to provide a quick disconnect coupling for use in highly pressurized systems which cannot be disconnected unless the manually operated depressor is withdrawn, sealing the access valve.

It is yet another object of the invention to provide a quick disconnect coupling which seals itself when the manually operated depressor is withdrawn from the access valve so that a hose supplying the quick disconnect coupling remains pressurized.

The result of the above objects is to provide a quick disconnect coupling which virtually eliminates leakage of pressurized gas from a closed system into the atmosphere, and which also provides safer conditions for operators of the quick disconnect coupling.

SUMMARY OF THE INVENTION

The above mentioned objects of the invention are realized by a device disclosed as follows. The quick disconnect coupling of the present invention comprises a housing upon which is mounted a spring biased sliding sleeve. The end of the housing is adapted for fitting a desired size access valve. The end of the housing also has cavities in which ball bearings are trapped between an innermost diameter of the cavity and the inside wall of the sliding sleeve.

When the sliding sleeve is biased into its closed position, the ball bearings are forced to protrude into the inside space of the end portion of the housing. When the sliding sleeve is pulled back into its open position, the ball bearings are allowed to move outwards into release zones in the end of the sliding sleeve. This allows the ball bearings to withdraw so that their surfaces are flush with the inside surface of the housing.

Such a sliding sleeve operates as follows. The sliding sleeve is pulled back allowing the ball bearings to move out of the interior portion of the housing. The end of the housing is then pressed down over a typical access valve which has a ridge about its outside circumference. When the coupling is completely over the end of the valve, the sliding sleeve is allowed to move forwards which forces the ball bearings to protrude into the inside space of the housing and contact the valve beyond the ridge of its outer circumference. This prevents the quick disconnect coupling from being removed from the valve without pulling back on the sliding sleeve. Further, according to the invention, a depressor member is mounted inside the housing. The depressor is mounted so that it is movable along the axis of the housing. The end of the depressor which corresponds to the end of the housing that is attached to the access valve has a projection. The projection is adapted to fit inside the valve and open the access core of the access valve when the depressor member is biased in the direction of the valve. According to the invention, the depressor is manually moved between its open and closed positions independently of the operation of the sliding sleeve. The housing is fitted with an O-ring or gasket which provides a seal with the end face of the access valve when the coupling is locked to the end of the valve. The coupling can thus be mounted to the end of an access valve in a sealed manner prior to establishing communication between the coupling and the valve, which is then establised by manipulating the projection of the depressor member into contact with the access core of the access valve.

According to the invention, the housing is further provided with a locking sleeve. The locking sleeve is mounted about the housing so that one end is in contact with the sliding sleeve and the other end is in contact with a knob which is used to manipulate the depressor member. The locking sleeve is of sufficient length so that when the depressor member is manipulated towards the access valve and into the position of establishing communication through the valve, the locking sleeve will not permit the sliding sleeve to be pulled backwards to allow the ball bearings to release the access valve. Such movement of the locking sleeve can only be accomplished when the depressor member is in the closed position where the access core of the valve is no longer depressed, and an 0 ring or gasket mounted on the depressor member has sealed and prevented communication through the housing. Thus, the quick disconnect coupling can only be removed from the valve when the depressor is withdrawn from the valve preventing leakage from the valve, and when the depressor member is also withdrawn to the point where communication through the housing is blocked. A hose or other type of conduit feeding pressurized gas through the coupling is, therefore, maintained in a pressurized state upon removal of the quick disconnect coupling from the access valve. Thus, no leakage can occur during connection/disconnection of the coupling to the valve.

It is highly important for the depressor member to be independently moved into the open and closed positions. Otherwise, leaks would develop during establishment of the connection of the coupling to the valve. Furthermore, pressure from the system of the access valve upon the depressor member prior to complete connection of the coupling to the valve could result in the coupling being blown away from the valve and out of the operator's hand, resulting in possible injury to the operator.

In the presently preferred embodiment, the depressor member is mounted inside the housing in a threaded fashion, so that rotation of a knob affixed to the end of the depressor member provides the required movement of the depressor member. It is noted that the required movement of the depressor could satisfactorily be achieved through the use of a lever, push bar, or other device providing for the movement of the depressor member towards and away from the access core of the valve.

A preferred embodiment of the locking sleeve is a cylindrical sleeve which is placed over the end of the housing so that one end contacts the knob of the depressor and the other end contacts the sliding sleeve. In such an embodiment, a groove is required to be located in the wall of the locking sleeve to allow the conduit to the supply of gas to pass through into the housing.

Thus disclosed is a quick disconnect coupling which provides for quick and efficient attachment to an access valve. The attachment to the valve can be accomplished without leakage of gas from the pressurized system into the atmosphere. The connection to the valve can also be accomplished safely without threat of harm to the operator. Finally, the quick disconnect coupling is prevented from being removed from the valve until the depressor member is withdrawn so that no leakage can result upon removal of the quick disconnect coupling.

BRIEF DESCRIPTION OF THE DRAWINGS

A detailed description of the preferred embodiments of the disclosed invention will now follow with reference to the accompanying drawings, in which.

DETAILED DESCRIPTION OF THE PREFERRED EMBODIMENTS

Figure 1:
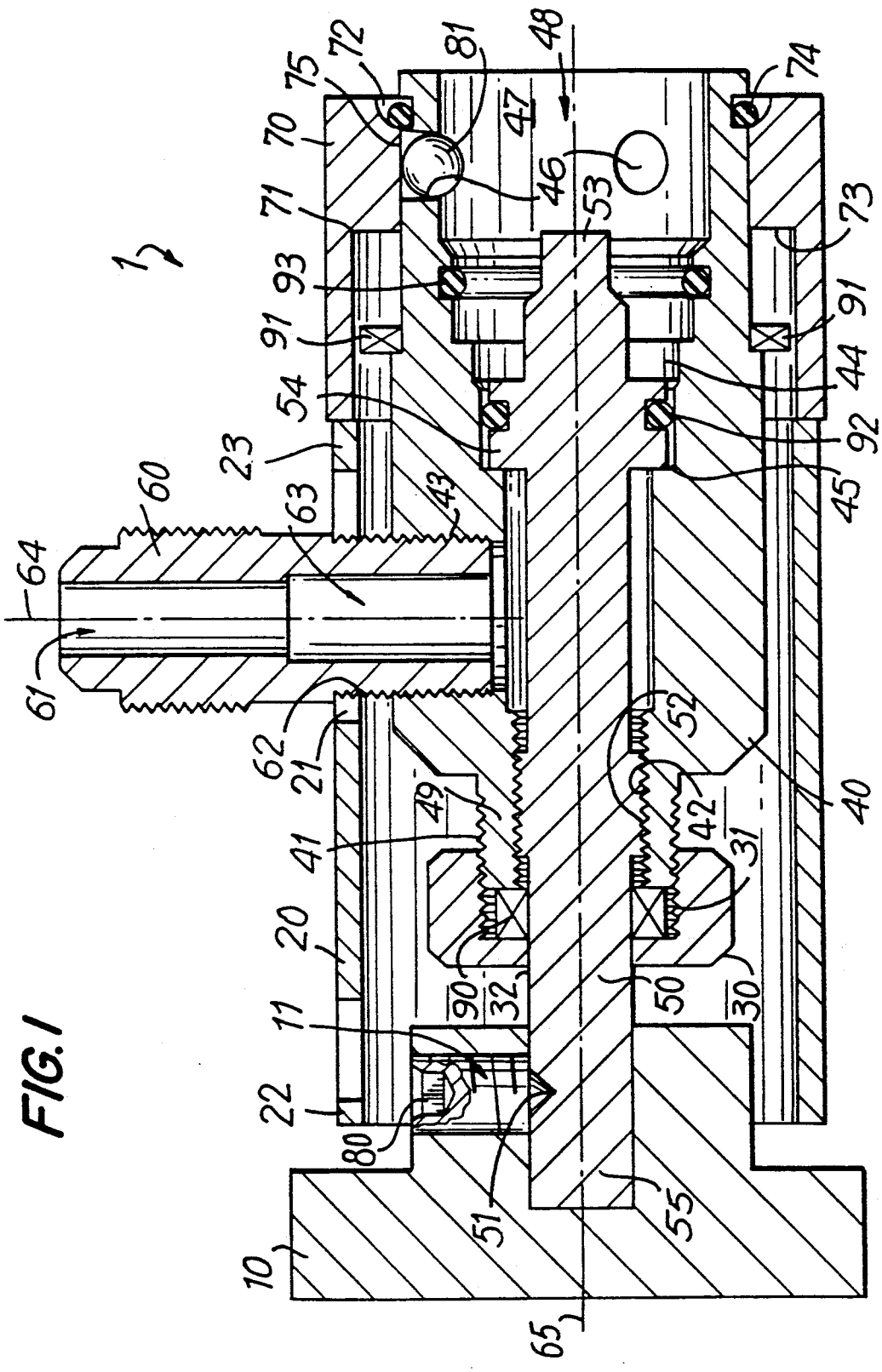
FIG. 1 is a side elevational cross section of the quick disconnect coupling in a closed position, according to the invention.
Figure 2:
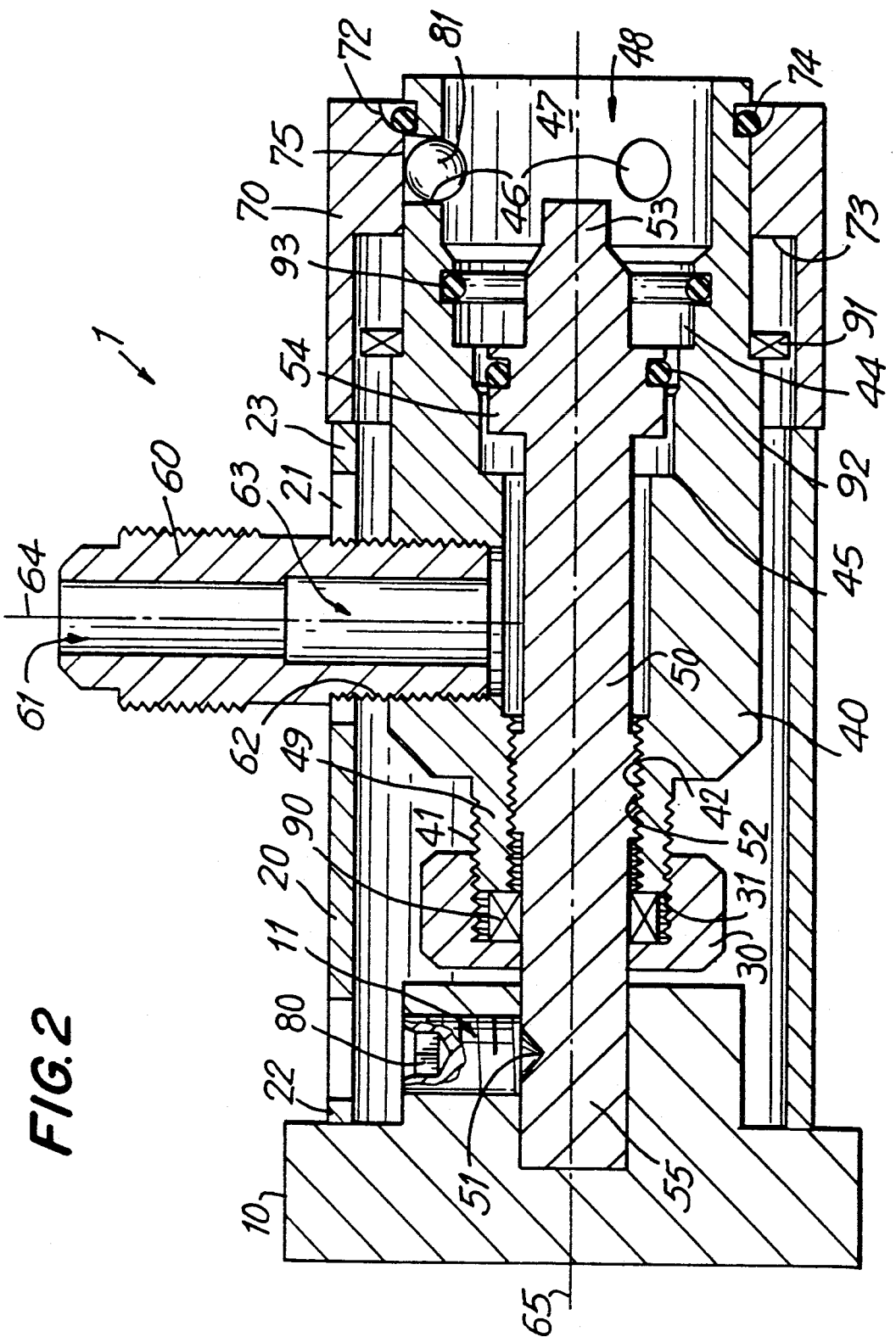
FIG. 2 is a side elevational cross sectional view of a quick disconnect coupling in an open position, according to the invention.

Referring now to FIGS. 1 and 2, a detailed description of one preferred embodiment of the disclosed invention will be described. The quick disconnect coupling 1 of the present invention comprises a housing 40 being substantially in the shape of a hollow cylinder, and having an inlet 47 at one end. An axial passage 48 passes through the center of the housing 40 from the inlet 47 to the distant end 49 of the housing. The housing has outer threads 41 about the distant end 49, and also inner threads 42 along the inside surface or diameter of the distant end 49. The housing 40 has a conduit passage 63 having an axis 64 which is normal to the axis 65 of the axial passage 48 of the housing 40.

A depressor 50 is mounted within the axial passage 48 of the housing 40. The depressor 50 has a projection 53 at one end, the projection 53 being located at the same end as the inlet 47 of the housing 40 when the depressor 50 is installed within the housing 40. The depressor 50 also has threads 52 located about the outer surface or diameter of a portion of the length thereof, said threads 52 engaging the inner threads 42 of the housing 40 so that the depressor 50 is threadably engaged inside the housing 40. The depressor 50 also has a notch 51 located in the end of the depressor 50 opposite to the projection 53 of the depressor 50. This end of the depressor will be designated as reference numeral 55. A knob 10 is affixed to the end 55 of the depressor 50. The knob 10 has a set screw passage 11 which is threaded to allow a set screw 80 to be threaded into the set screw passage 11 to engage the notch 51 of the depressor 50. This locks the knob 10 to the end 55 of the depressor 50 and allows the depressor 50 to be rotated by turning the knob 10.

The distant end 49 of the housing 40 is sealed about the depressor by a nut 30 having threads 31 which are engaged with the outer threads 41 of the housing 40. The nut has a centrally located opening 32 through which the end 55 of the depressor 50 passes. Flow through the end 49 of the housing 40 is blocked by a nut gasket 90 located inside the nut 30 and frictionally engaging the outer surface of the depressor 50.

A supply of gas is provided to the housing 40 through a conduit 60. The conduit 60 has threads 62 for fastening in the conduit passage 63. The threads 62 of the conduit 60 engage conduit threads 43 of the housing. The conduit 60 has a passage 61 through which pressurized gas is supplied.

The inlet 47 of the housing 40 has ball bearing cavities 46 located about its periphery. A sliding sleeve 70 is slidably mounted to the housing 40 at the same end as the inlet 47. The sliding sleeve 70 has an inside surface 71 which has two operative levels having different inside diameters. The first level is a closing surface 75. The other level is a release zone 72 having a larger inside diameter than the closing surface 75.

The sliding sleeve 70 is mounted on the end of the housing 40 in such a fashion that it is movable between two positions. In the first position, the closing surface 75 of the sliding sleeve 70 overlies the ball bearing cavities 46 of the housing 40. In the second position, the release zone 72 of the sliding sleeve 70 overlies the ball bearing cavities 46 of the housing 40.

Ball bearings 81 are retained in the ball bearing cavities 46 of the housing 40 so that when the closing surface 75 of the sliding sleeve 70 coincides with the ball bearing cavities 46 the ball bearings 81 are forced into the ball bearing cavities 46, by the inside diameter of the closing surface 75, causing the ball bearings 81 to protrude or extend into the inlet fitting 47 of the housing 40. When the sliding sleeve is pulled back so that the release zone 72 coincides with the ball bearing cavities 46, the ball bearings 81 are allowed to move outwards and into the larger inside diameter of the release zone 72 of the sliding sleeve 70, and thus no longer extend into the inlet 47 of the housing 40.

Such a configuration allows the sliding sleeve 70 to be pulled backwards so that the ball bearings 81 move out of the inlet 47 of the housing 40 so that an access valve (shown in FIG. 4 as element 100) can be passed into the inlet 47 of the housing 40. Such valves are standardly equipped with a ridge about the perimeter of the valve. When the sliding sleeve 70 is allowed to move back to the position where the closing surface 75 coincides with the ball bearing cavities 46, the ball bearings 81 are forced partially back into the inlet 47 of the housing 40, where they extend in and about the ridge of the access valve and prevent the valve from being removed from the inlet 47 of the housing 40. A spring 76 (FIG. 1) may optionally be disposed to bias the sliding sleeve 70 towards the position where the closing surface 75 coincides with the ball bearing cavities 46.

A housing O-ring 93 is mounted on the inside surface of the housing 40 inside the inlet 47 of the housing 40 to contact the access valve when it is locked into the inlet 47 and provide a seal.

The depressor 50 also has a widened portion 54 which fits into a by-pass chamber 44 of the axial passage 48 of the housing 40. Thus, when the depressor 50 is threaded in the direction of the end 55 of the depressor 50, a depressor O-ring 92 fixed in the widened portion 54 of the depressor 50 contacts the walls of the by-pass chamber 44, closing the axial passage 48 to flow of gas from the conduit 60. The walls of the by-pass chamber 44 of the housing 40 are formed in the shape of an O ring seat 45 for this purpose.

A sliding sleeve lock ring 74 is held in a peripheral groove 82 located about the outer surface of the inlet 47 of the housing 40. This sliding sleeve lock ring 74 prevents the sliding sleeve 70 from sliding off the end of the inlet 47 of the housing 40. A sleeve gasket 91 may be located about the outer surface of the housing 40 to abut the sliding sleeve 70 at contact surface 73 of the sliding sleeve 70 when the sliding sleeve 70 is pulled into its opened position, said sleeve gasket 91 preventing the sliding sleeve from moving too far away from the inlet 47 of the housing 40.

A locking sleeve 20, may be slidably affixed to the outer surface of the housing 40. The locking sleeve 20 is of such a length that when the depressor 50 is moved toward the access valve, the knob 10 contacts the end 22 of the locking sleeve 20 and forces the other end 23 against the rear surface 76 of the sliding sleeve 70. Thus, when the quick disconnect coupling 1 is affixed to a valve at the inlet 47 of the housing 40, and the depressor 50 is moved towards the valve so that the projection 53 of the depressor 50 contacts the access core of the valve and establishes communication through the quick disconnect coupling 1 and to the valve, the knob 10 contacts one end 22 of the locking sleeve 20 and prevents the locking sleeve 20, and thus the sliding sleeve 70, from being pulled away from the valve. This prevents the quick disconnect coupling from being disconnected from the access valve while the depressor 50 is in a position which will allow gas to escape from the conduit 60 and also from the opened access valve.

The locking sleeve 20 has a slide groove 21 located lengthwise in its wall, which allows the conduit 60 to pass through the locking sleeve 20 and allows the locking sleeve 20 to move towards and away from the sliding sleeve 70.

Figure 3:
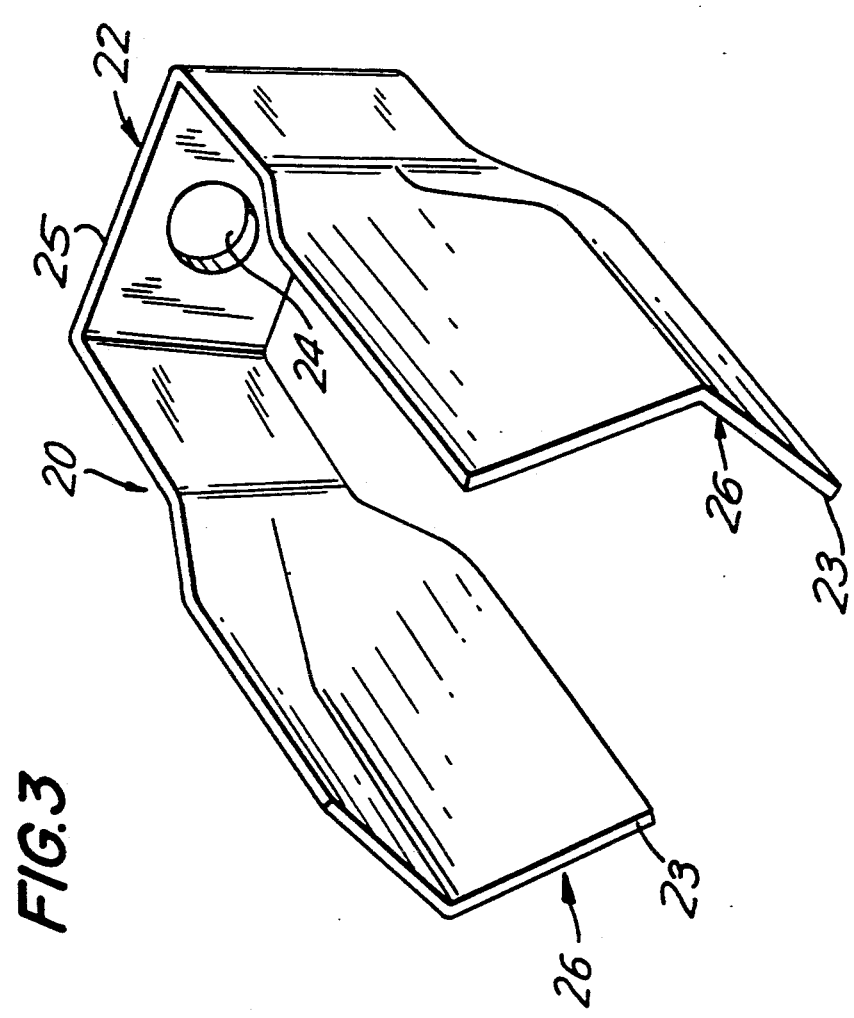
FIG. 3 is a perspective view of an alternate embodiment of a locking sleeve of a quick disconnect valve, according to the invention.

In an alternate embodiment of the invention (FIGS. 3, 4), the locking sleeve 20 could be made out of a single sheet of rectangular material formed in the shape of a square U. The square U shaped locking sleeve 20 would have a hole 24 in its base 25 which would allow the end 55 of the depressor to pass through to the knob 10. The ends of the "arms" 26 of the square U shaped sleeve 20 opposite to the bottom 25 of the sleeve 20 would contact the sliding sleeve 70 as required. This configuration obviates the need for slide grooves 21 to accommodate the conduit 60.

Figure 4:
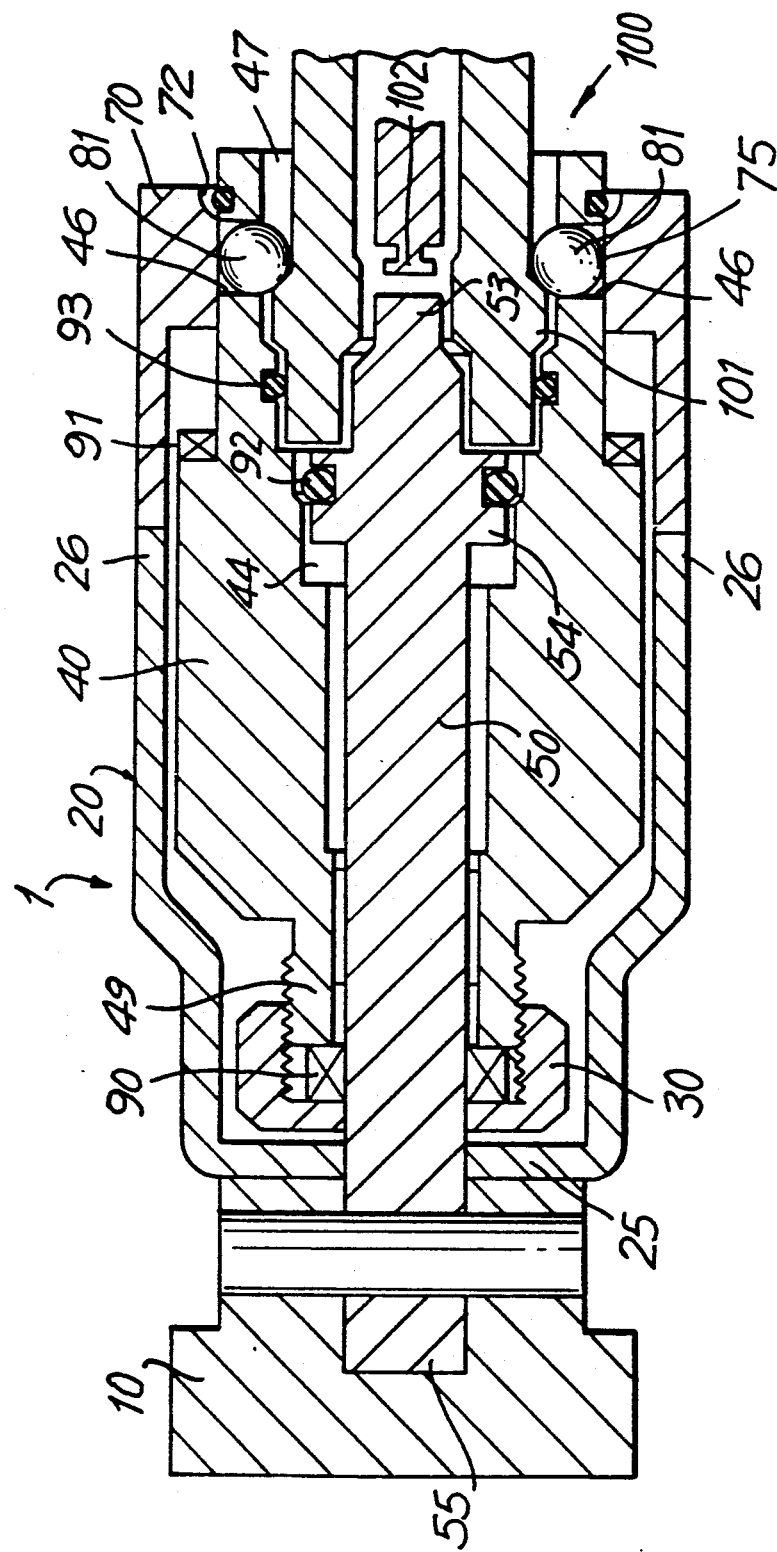
FIG. 4 is a side elevational cross sectional view of a quick disconnect coupling, attached to an access valve, in an open position and incorporating the locking sleeve of FIG. 3, according to the invention.

FIG. 4 shows a quick disconnect coupling 1 of an alternate embodiment, attached to an access valve 100.

Referring to FIGS. 1, 2 and 4, the quick disconnect coupling operates as follows.

The depressor 50 is originally in a closed position (as shown in FIG. 1) wherein the depressor projection 53 is withdrawn from the inlet fitting 47 as far as possible, and the depressor O ring 92 closes off flow through the by-pass chamber 44 of the housing 40 thus keeping the conduit 60 and its attached hose to the source of gas in a pressurized state. In this disposition, the locking sleeve 20 can be pulled back towards the knob 10 allowing the sliding sleeve 70 to also be pulled back in that direction. With the sliding sleeve 70 pulled back, the release zone 72 of the sliding sleeve 70 aligns with the ball bearing cavities 46 of the housing 40. The inlet 47 of the housing is then pressed over the outside surface of an access valve 100. The ridge 101 about the circumference of the valve pushes the ball bearings 81 into the release zone 72 as it passes by. Once the valve 100 is all the way inside the inlet 47 so that the peripheral ridge 101 of the valve 100 is beyond the ball bearing cavities 46, the sliding sleeve 70 is moved back into the position where the closing surface 75 of the slide sleeve 70 forces the ball bearings 81 partially into the inlet 47 and in a locking position behind the ridge 101. This prevents the access valve 100 from being withdrawn from the inlet 47. At this time, communication is still not established either through the valve 100 or through the quick disconnect coupling 1.

The knob 10 is then manually turned to cause the depressor 50 to move towards the access core 102 of the valve. Once the widened portion 54 of the depressor passes beyond the by-pass chamber 44 of the housing 40, flow through the conduit into the quick disconnect coupling is established. Once the projection 53 of the depressor 50 contacts the access core 102 of the valve 100, flow is also established through the valve 100. The system to be charged or serviced is then in communication with the reservoir of gas.

When the quick disconnect coupling 1 is attached to an access valve 100, the locking sleeve 20 is pressed by the knob 10 against the sliding sleeve 70 keeping the closing surface 75 of the sliding sleeve 70 in contact with the ball bearings 81. The locking sleeve 20 thus prevents the sliding sleeve 70 from being pulled back to release the valve 100 while the depressor 50 is allowing communication through the conduit and through the access valve.

Once the charging of the system is complete, the knob 10 is rotated to withdraw the depressor 50 from the valve 100. This seals both the valve and the quick disconnect coupling. Once the depressor 50 is withdrawn to the stage where flow through the coupling and from the valve is no longer possible, the sliding sleeve 70 can be pulled back away from the access valve, releasing the ball bearings 81, and thus releasing the coupling from the valve.

It should be noted that the manually operated depressor 50 of the presently described embodiment is the preferred embodiment of the present invention. The depressor could also be independently operated by various other means such as levers, push bars or other means which would contact the locking sleeve 20 to prevent removal of the quick disconnect coupling while gas is flowing.

It should be further understood that various modifications could be made to the disclosed preferred embodiment without departing from the scope or spirit of the disclosed invention.

We claim:

1. A quick disconnect coupling for an access valve, comprising:
   a housing, having a first end, a second end, a central passage having a axis running from said first end of said housing to said second end of said housing, a conduit opening communicating with said central passage, an inlet located in said second end of said housing, and ball bearing cavities spaced about a circumference of said inlet;
   a depressor, having a first end and a second end, being mounted for longitudinal movement in said central passage of said housing so that said first end and said second end of said depressor are respectively in coaxial juxtaposition to said first end and said second end of said housing, said depressor being movable between an open position permitting communication through said central passage and a closed position where communication through said central passage is blocked;
   a conduit for supplying a fluid in communication with said central passage of said housing; and
   quick disconnect means for coupling and uncoupling the quick disconnect coupling to the access valve; and
   means for moving said depressor between said open and said closed position, independent of said quick disconnect means.

2. A quick disconnect coupling according to claim 1, wherein said quick disconnect means comprises:
   a sliding sleeve, slidably fixed about an outer surface of said second end of said housing, having an inner surface, and a closing surface and a release zone located on said inner surface of said sliding sleeve, said sliding sleeve being slidable between locked and unlocked positions, said closing surface of said sliding sleeve overlying said ball bearing cavities when said sliding sleeve is in said locked position, and said release zone overlying said ball bearing cavities when said sliding sleeve is in said unlocked position; and
   ball bearings, retained in said ball bearing cavities, so that when said sliding sleeve is in said locked position, said closing surface of said sliding sleeve contacts said ball bearings, forcing said ball bearings to extend into said central passage at said second end of said housing to lock the coupling to the access valve, and when said sliding sleeve is in said unlocked position, said ball bearings are free to move into said release zone of said sliding sleeve to release the coupling from the access valve.

3. A quick disconnect coupling according to claim 1, further comprising:
   a locking sleeve, slidably mounted about said outer surface of said housing and being slidable between a locked and an unlocked position, said locking sleeve having a first end and a second end, said first end of said locking sleeve abutting said first end of said depressor, and said second end of said locking sleeve abutting a sliding sleeve, of said quick disconnect means so that when said depressor is in said closed position, said locking sleeve is in said unlocked position and said sliding sleeve is free to be moved between locked and unlocked positions, and when said depressor is in said open position, said locking sleeve is in said locked position to prevent said sliding sleeve from being moved to said unlocked position.

4. A quick disconnect coupling according to claim 2, further comprising:
   a locking sleeve, slidably mounted about said outer surface of said housing and being slidable between a locked and an unlocked position, said locking sleeve having a first end and a second end, said first end of said locking sleeve abutting said first end of said depressor, and said second end of said locking sleeve abutting said sliding sleeve, so that when said depressor is in said closed position, said locking sleeve is in said unlocked position and said sliding sleeve is free to be moved between said locked and unlocked positions, and when said depressor is in said open position, said locking sleeve is in said locked position to prevent said sliding sleeve from being moved to said unlocked position.

5. A quick disconnect coupling according to claim 4, wherein said means for moving said depressor comprises a knob being affixed to said first end of said depressor and having an abutment face which contacts said first end of said locking sleeve, said knob being used to move said depressor between said open and said closed positions, and said abutment face moving said locking sleeve between said locked and said unlocked positions.

6. A quick disconnect coupling according to claim 5, wherein said depressor has a region of outward facing threads, and said housing has a region of inward facing threads, and said threads of said depressor and of said housing are engaged so that said knob can be rotated to move said depressor between said open and said closed positions.

7. A quick disconnect coupling according to claim 6, wherein said sliding sleeve is biased toward said locked position by a spring located inside said inner surface of said sliding sleeve.

8. A quick disconnect coupling according to claim 4, wherein said locking sleeve is cylindrical in shape and has an axial groove in a wall of said locking sleeve through which said conduit passes, allowing said locking sleeve to be moved between said locked and said unlocked positions.

9. A quick disconnect coupling according to claim 4, wherein said locking sleeve comprises a single rectangular sheet of material folded into a square U shape and having a bottom, arms, and a hole in said bottom of said sleeve through which said first end of said depressor passes, said bottom of said U shaped locking sleeve being said first end of said locking sleeve, and upper ends of said arms of said U shaped locking sleeve being said second end of said locking sleeve.

* * * * *